H. KROGMOE.
TRACTOR WHEEL.
APPLICATION FILED MAY 10, 1913.
1,128,988. Patented Feb. 16, 1915.
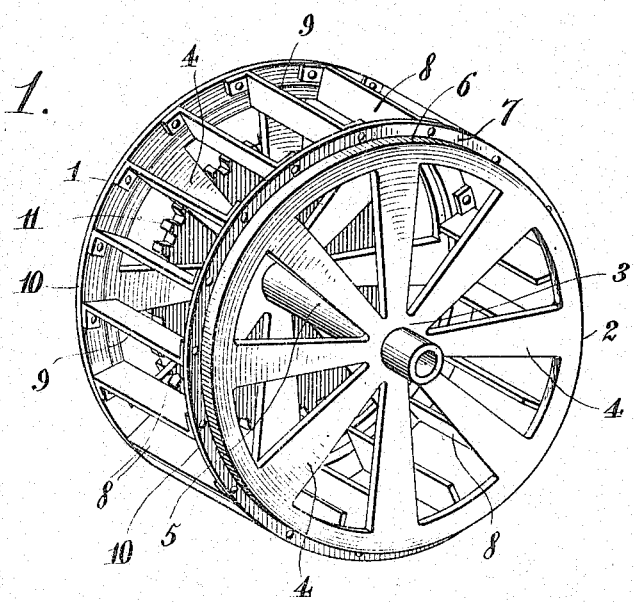
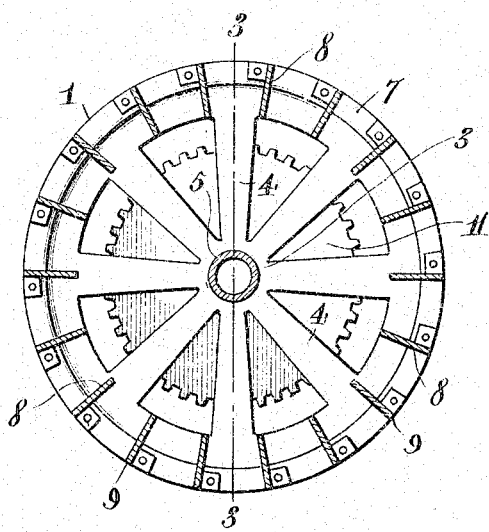
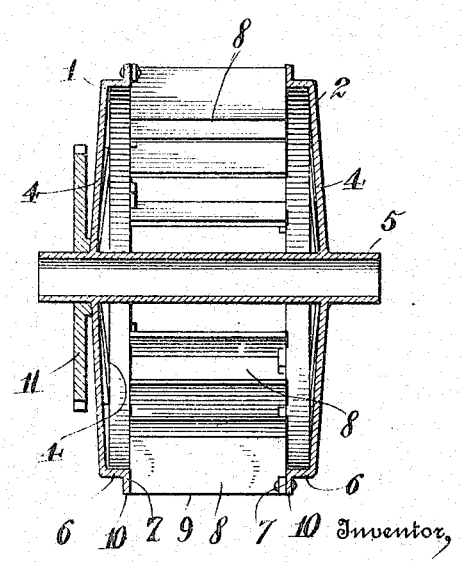

UNITED STATES PATENT OFFICE.

HANS KROGMOE, OF TURTLE LAKE, NORTH DAKOTA.

TRACTOR-WHEEL.

1,128,988.

Specification of Letters Patent.

Patented Feb. 16, 1915.

Application filed May 10, 1913. Serial No. 766,779.

*To all whom it may concern:*

Be it known that I, HANS KROGMOE, a citizen of the United States, residing at Turtle Lake, in the county of McLean and State of North Dakota, have invented new and useful Improvements in Tractor-Wheels, of which the following is a specification.

This invention relates to tractor wheels designed especially for use upon traction-engines, agricultural machines or the like; and it has for its primary object the provision of means for insuring an operative purchase of the wheel against the ground regardless of the condition of the ground and for preventing the wheel from sinking too low in the soil and for preventing skidding movements of the wheel.

With the above and other objects in view, the invention consists of certain novel features of construction, combination and arrangement of parts, as will be hereinafter described and claimed.

In the accompanying drawings:—Figure 1 is a perspective view of the wheel; Fig. 2 is a vertical section therethrough; and Fig. 3 is a section on line 3—3 of Fig. 2.

The wheel comprises side disks 1 and 2 substantially of identical form and preferably constructed of metal and provided with inner portions 3 and radial spokes 4. The portion 3 of one of the disks is alined with the similar portion of the other disk and connected therewith through a hub 5 of any suitable well known construction. The disks are provided with outer annular relatively broad shoulders 6, the shoulder of one of the disks being alined with the shoulder of the other disk so that both shoulders operate in conjunction to increase the horizontal proportions of the bearing surface of the wheel to prevent the latter from sinking in the soil for too great a depth. From the shoulders 6, the disks are provided with continuous flanges 7, which are designed to hold the wheel against lateral skidding.

The tractor blades 8 of metal are interposed between the disks 1 and 2 and provided with attaching ends, which are secured in any suitable well known manner to the inner surfaces of the disks. These blades are of identical thickness throughout, being constructed preferably of thin metal whereby their outer horizontal edges 9 are substantially in line with the adjacent annular edges 10 of the flanges 7. The blades are equidistantly mounted around the wheel and are disposed radially of the hub and parallel therewith so that they will be made to effectually enter the soil and obtain such purchase as will insure an operative revolving action of the wheel that may be necessary to propel the object. The wheel is provided at one side with a driving sprocket 11, which may be constructed in any suitable well known manner.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as claimed.

Having thus described my invention, what I claim is:—

The herein described tractor wheel comprising a pair of spaced disks having horizontally arranged and extending annular shoulders on their inner sides near their peripheries and also having vertical tread flanges at the opposing sides of said shoulders, a tubular hub member connecting the centers of said disks and radially arranged and spaced blades at the periphery of the wheel, between and having oppositely extending ends secured to the inner sides of said tread flanges of the disks.

In testimony whereof I affix my signature in presence of two witnesses.

HANS KROGMOE.

Witnesses:
H. O. FORGERSON,
C. A. LEHN.